United States Patent [19]

Arai et al.

[11] Patent Number: 4,988,661
[45] Date of Patent: Jan. 29, 1991

[54] STEAM REFORMING CATALYST FOR HYDROCARBONS AND METHOD OF PRODUCING THE CATALYST

[75] Inventors: Hiromichi Arai, Fukuoka; Jun Kitagawa; Yasuo Nishioka, both of Shimonoseki, all of Japan

[73] Assignee: Catalysts and Chemicals Inc., Far East, Tokyo, Japan

[21] Appl. No.: 400,498

[22] Filed: Aug. 30, 1989

[30] Foreign Application Priority Data

Sep. 9, 1988 [JP] Japan .................. 63-224802

[51] Int. Cl.$^5$ .................. B01J 21/04; B01J 23/58; B01J 23/78; B01J 23/89
[52] U.S. Cl. .................. 502/327; 502/328; 423/651
[58] Field of Search .................. 502/327, 328; 423/651

[56] References Cited

U.S. PATENT DOCUMENTS

| | | | |
|---|---|---|---|
| 3,340,011 | 9/1967 | Hoekstra et al. | 423/651 |
| 3,391,089 | 7/1968 | Mayland et al. | 502/328 |
| 3,467,506 | 9/1969 | Roche | 48/214 |
| 3,839,223 | 10/1974 | Schwab et al. | 502/328 X |
| 4,183,829 | 1/1980 | Adachi et al. | 252/466 T |
| 4,711,872 | 12/1987 | Kato et al. | 502/328 |
| 4,788,174 | 11/1988 | Arai | 502/328 X |

FOREIGN PATENT DOCUMENTS

| | | |
|---|---|---|
| 0192314 | 8/1986 | European Pat. Off. . |
| 0270203 | 6/1988 | European Pat. Off. . |
| 0279389 | 8/1988 | European Pat. Off. . |
| 997523 | 7/1965 | United Kingdom . |
| 2118857 | 11/1983 | United Kingdom . |

*Primary Examiner*—W. J. Shine
*Attorney, Agent, or Firm*—Ladas & Parry

[57] ABSTRACT

An excellent steam reforming catalyst for hydrocarbons is provided having at least one of nickel oxide, cobalt oxide and platinum group noble metals supported on a carrier consisting essentially of aluminum oxide $Al_2O_3$ and a metal oxide expressed by MeO, comprising about 3–35 mols of metal oxide MeO to 100 mols of aluminum oxide $Al_2O_3$ in the carrier, Me being at least one metal selected from the group consisting of calcium Ca, barium Ba and strontium Sr. The catalyst exhibits high activity, superior mechanical strength, good heat resistant property, splendid chemical stability, and remarkable thermal shock resistant property, retains a high specific surface area at high temperatures, and does not form detrimental nickel aluminate or cobalt aluminate in steam reforming reactions of hydrocarbons.

A method of producing the catalyst is also provided.

11 Claims, 5 Drawing Sheets

FIG_4

FIG.5

STEAM REFORMING CATALYST FOR HYDROCARBONS AND METHOD OF PRODUCING THE CATALYST

BACKGROUND OF THE INVENTION

1. Field of the Invention

The present invention relates to a steam reforming catalyst for hydrocarbons for production of hydrogen, synthetic gases or town gases, and a method of producing the catalyst.

2. Related Art Statement

Heretofore, catalysts having catalytically active component Ni or Co supported on alumina-based carriers have been widely used as catalysts for reforming hydrocarbons. Platinum group noble metals, such as Rh and Ru, can be used also as the active components. However, they are so expensive that they have not been used so widely as Ni and Co, though they have higher activities than Ni and Co.

Carriers made of oxide of Mg, Ca, Sr, Ba, Al, Ce, Si, Ti, Zr, or combinations of at least two thereof are known. Among them, alumina is mostly used as the carrier from the viewpoints of mechanical strength, heat resistant property and chemical stability, etc. An improved alumina carrier added with an oxide of an alkaline earth metal is also known. For example Japanese Patent Application Publication No. 44-17,737 discloses a reforming catalyst added with 10-20 wt % of Mg, Ca, Sr or Ba, which has less deposition of carbon thereon during the use in the reforming reaction.

Further, Japanese Patent Application No. 61-264,097 (Laid-open No. 63-141,643) discloses a catalyst prepared by supporting at least one of V, Cr, Mn, Fe, Co, Ni, Cu, Mo, Ag, Cd, La, Ce, perovskite and platinum group noble metals on a carrier containing aluminum oxide and a metal oxide expressed by MeO (Me is Ca, Ba or Sr) in a mol ratio of 100:(3-25), which is mainly used for catalytic combustion processes.

Catalysts using conventional alumina series carriers have the following drawbacks;

(1) If Ni or Co supported on alumina is exposed to a high temperature oxidizing atmosphere, nickel aluminate or cobalt aluminate which is a compound of Ni or Co and alumina is formed to decrease the catalyst activity.

(2) During the reforming reaction, the surface of the catalyst is covered by carbon formed by reactions, such as disproportionation of CO and decomposition of $CH_4$, to decrease the strength and the activity of the catalyst.

For obviating the drawback (2), an attempt has been made to add a basic component to the alumina to neutralize the acid point of the alumina. However, if K is added as the basic component to the alumina, K is dissipated from the catalyst during the reforming reaction. While, if MgO is added as the basic component to the alumina, hydroxide of Mg is formed in the presence of steam, so that the formed catalyst assumes a powdery state during the reforming reaction.

SUMMARY OF THE INVENTION

An object of the present invention is to obviate the above drawbacks.

Another object of the present invention is to provide a steam reforming catalyst which has a high specific surface area and does not form nickel aluminate or cobalt aluminate even in a high temperature oxidizing atmosphere, and which substantially does not suffer from decrease of activity and strength caused by deposition of carbon, etc., during the reforming reaction.

The present invention is a steam reforming catalyst for hydrocarbons having at least one of nickel oxide, cobalt oxide and platinum group noble metals supported on a carrier composed essentially of aluminum oxide $Al_2O_3$ and a metal oxide expressed by MeO, comprising metal oxide MeO and aluminum oxide in a mol ratio of about (3-25):100 in the carrier, Me being at least one metal selected from the group consisting of calcium Ca, barium Ba and strontium Sr.

The catalyst of the present invention can contain about 3-50 parts by weight of at least one of nickel oxide and cobalt oxide supported on the carrier, relative to 100 parts by weight of the carrier.

The catalyst of the present invention can contain about 0.03-3 parts by weight of at least one platinum group noble metal supported on the carrier, relative to 100 parts by weight of the carrier.

The catalyst of the present invention can contain about 3-50 parts by weight of at least one of nickel oxide and cobalt oxide, and about 0.03-parts by weight of at least one platinum group noble metal, supported on the carrier relative to 100 parts by weight of the carrier.

Preferably, the aluminum oxide and the metal oxide expressed as MeO essentially composing the carrier are in a form of complexed oxides expressed mainly as $MeO \cdot 6Al_2O_3$ in the carrier.

The carrier can contain a forming additive in addition to the essential component of the carrier.

Preferably, the forming additive is a calcium aluminate cement, and the amount thereof is about 10-40 wt % relative to the essential component of the carrier.

Also, the present invention is a method of producing a reforming catalyst for hydrocarbons, comprising mixing aluminum oxide $Al_2O_3$ and/or aluminum hydroxide and an Me compound (wherein Me is at least one metal element selected from Ca, Ba and Sr) in an $Al_2O_3$:MeO mol ratio of 100:(3-25) to form a mixture, calcining the mixture to produce a catalyst carrier, impregnating the catalyst carrier with an aqueous solution of at least one of nickel compounds, cobalt compounds, and platinum group noble metals, and calcining the impregnated catalyst carriers.

The aluminum oxide and metal oxide may be present in a mol ratio of about 100:(3-35) and will preferably be present in a mol ratio of about 100:(11.1-17.6).

In producing the catalyst carrier for the catalyst of the present invention, a forming additive, such as calcium alumina cement, can be added to the mixture of aluminum oxide $Al_2O_3$ and/or aluminum hydroxide and Me compound, and then the added mixture is formed before calcination. The addition of the forming additive improves not only the mechanical strength and spalling-proof property of the steam reforming catalyst of the present invention, but also exhibits quite unexpected remarkable increase of the activity.

In a preferred embodiment of the present invention, the mixture of aluminum oxide $Al_2O_3$ and/or aluminum hydroxide and Me compound is a coprecipitate or a hydrolysis product or a heat decomposition product obtained from mixed solution of a water soluble or alcohol soluble aluminum compound and a water soluble or alcohol soluble compound of Me.

In another preferred example of the method of the present invention, a portion or the whole of the mixture of aluminum oxide $Al_2O_3$ and/or aluminum hydroxide and Me compound is a hydrolysis product or a heat decomposition product of a mixed or complexed alkoxides of aluminum and the metal Me.

Preferably, a portion or the whole of the aluminum oxide $Al_2O_3$ and/or aluminum hydroxide contained in the mixture before calcination is a hydrolysis or a heat decomposition product of at least one aluminum alkoxide.

In a preferred embodiment of the present invention, the catalyst carrier is produced by mixing and/or kneading powdery aluminum oxide $Al_2O_3$ and/or powdery aluminum hydroxide and a powdery Me compound or a solution of Me compound, and calcining.

The catalyst carrier used in the present invention consists essentially of $CaO.6Al_2O_3$, $BaO.6Al_2O_3$ or $SrO.6Al_2O_3$, and shows an excellent heat resistant property even at high temperatures at which the steam reforming reactions are effected. Crystal structure of $CaO.6Al_2O_3$, $BaO.6Al_2O_3$ and $SrO.6Al_2O_3$, is a layered alumina structure, which is considered to be a cause of the high heat resistant property of the catalyst carrier. Existence of the layered alumina structure in the carrier can be ascertained by an X-ray diffraction analysis.

The existence of $CaO.6Al_2O_3$, $BaO.6Al_2O_3$, and $SrO.6Al_2O_3$ is considered to prevent the formations of nickel aluminate and cobalt aluminate so as to provide a steam reforming catalyst having a stable acitvity.

The catalyst carriers of the present invention are produced as follows, as described in Japanese Patent Application Laid-open No. 62-153,158.

A catalyst carrier of the steam reforming catalyst of the present invention is preferably produced by mixing a water soluble aluminum salt and a water soluble barium salt in water in a molar ratio of $Al_2O_3$:$BaO$ of 100:(3-25) to form an aqueous solution, adding a coprecipitant to the aqueous solution to produce a mixed composition in a form of a coprecipitate, removing the solvent from the coprecipitate by washing and filtering the coprecipitate or evaporating to dryness, precalcining the coprecipitate at about 200°-500° C., and calcining the precalcined coprecipitate at a temperature of not less than about 900° C. for about 5-30 hours. In this case, as the water soluble aluminum compound, aluminum nitrate, aluminum sulfate, aluminum chloride, etc., can be used. As the water soluble barium compound, barium nitrate, barium chloride, barium acetate, etc., can be used. As the coprecipitating agent or coprecipitant, sodium hydroxide, sodium carbonate, caustic potash and aqueous ammonia, etc., can be used. As the water soluble starting materials, basic salt such as sodium aluminate and barium hydroxide, etc., can be used. In this case, acidic coprecipitant such as nitric acid or carbonic acid should be used. The precalcination step may be omitted, as the case may be.

In a more preferable production method of the catalyst carrier of the steam reforming catalyst of the present invention, an alkoxide method may be used which uses mixed or complexed alkoxides of aluminum and barium as a starting raw material. Formation of the oxide of aluminum and barium from their alkoxides is preferably effected through their hydrolysis reactions, though other process such as thermal decomposition, etc., can be used. It is not necessary that all of these oxides are prepared from the corresponding alkoxides. For example, alumina, barium carbonate, etc., can be added to the hydrolysis product or the heat decomposition product of the alkoxides. The hydrolysis reaction is preferably effected at about 50°-100° C. than to effect at room temperature. Influence of pH of water added for hydrolysis reaction is not noticeable. However, influence of aging time after the addition of water on the specific surface area of the heat resistant carrier is quite large. The longer the aging time is, the larger the specific surface area is. Thus, the aging time is preferably at least one hour, and more preferably as long as possible, such as 5-10 hours, within an economically permissible extent. The inventors have found out that specific surface area of the heat resistant carrier is influenced by an amount of water used in the hydrolysis, and that an unexpectedly large specific surface area can be obtained, even when the amount of water used in the hydrolysis is less than the amount of water necessary for hydrolyzing all the amount of existing complexed or mixed alkoxides into hydroxides and alcohols (hereinafter, abbreviated as "equivalent amount of water"). Thus, the amount of water can be less than the equivalent amount of water. However, less than about 0.5 equivalent amount of water is not preferable, because specific surface area of the produced heat resistant catalyst carrier decreases rapidly. On the other hand, use of an unnecessarily large amount of water in the hydrolysis is not preferable, because it incurs an excessive investment cost and energy consumption, so that water amount is preferably equal to or less than about 10 equivalent amount of water from an economical viewpoint. Therefore, amount of water to be used is generally about 0.5-10 equivalent amount of water. However, the amount of water is not exclusively limited to this range, and water amount beyond this range can be used, if some inefficiency is tolerable.

In a preferred embodiment of production, the catalyst carrier of steam reforming catalysts of the present invention is produced by dissolving aluminum alkoxide and barium alkoxide in an $Al_2O_3$:$BaO$ mole ratio of 100:(3-25) in alcohol to form an alcoholic solution, adding about 0.5-10 equivalent amount of water to the alcoholic solution to hydrolyze the alkoxides at a temperature of 50°-100° C., aging the hydrolyzed solution for 5-10 hours, removing the solvent by e.g. filtering, evaporation to dryness to obtain a mixture of decomposed products, precalcining the mixture of decomposed products at a temperature of about 200°-500° C., and calcining the precalcined mixture at a temperature of not less than about 900° C. for about 5-30 hours. Sometimes, the precalcination step may be omitted, as the case may be.

The produced catalyst carrier is used for the production of the steam reforming catalyst of the present invention. In this case, a usual method of producing a steam reforming catalyst can be used for the production.

As the raw material for the active ingredient Ni, use is made of nickel acetate, nickel sulfate, nickel chloride, nickel carbonate, nickel citrate, nickel hydroxide, nickel nitrate, nickel bromide, nickel iodide, and the like nickel compounds.

As the raw material for the active ingredient Co, use is made of cobalt acetate, cobalt sulfate, cobalt chloride, cobalt carbonate, cobalt citrate, cobalt hydroxide, cobalt nitrate, and the like cobalt compounds.

As the raw material for the active ingredient platinum group noble metal, use can be made of inorganic salts such as nitrate, organic salts such as acetate, halides such as chloride, halogeno complexes, ammono complexes, cyano complexes and any other compounds generally used as raw materials in the production of catalysts.

In producing the catalyst using nickel as an active ingredient, use can be made of impregnation method wherein a previously formed carrier is impregnated with a solution of a nickel compound, dried and calcined to support nickel of a desired amount on the carrier, coprecipitation method of coprecipitating a catalyst component and a carrier component, precipitation method wherein nickel is precipitated by addition of a precipitant to an aqueous solution of a nickel compound in the presence of a powdery carrier, and kneading method wherein a nickel compound and a carrier material is mixed in a slurry or paste state, then formed, dried and calcined, and the like methods.

The catalyst of the present invention contains 3–50 wt % of nickel, calculated as NiO. If the NiO content is less than 3 wt %, the catalyst has low activity in steam reforming reaction, and if the content exceeds 50 wt %, the superior properties of the carrier are not reflected to the properties of the catalyst. More preferable NiO content is in a range of 5–25 wt %.

The same as described about the production method using Ni as an active ingredient can be applied about the production method of catalyst using cobalt a the active ingredient and the production method of the catalyst using both nickel and cobalt as the active ingredients.

Production methods of the catalyst using a platinum group noble metal alone or together with nickel oxide and/or cobalt oxide as active ingredients, can be practiced in a similar manner as the production method of the catalyst using nickel as the active ingredient. However, the content of the noble metals is preferably in a range of 0.03–3 wt %. If the noble metal content is less than 0.03 wt %, the activity of the catalyst in the steam reforming reaction is insufficient, while the content exceeding 3 wt % is not advisable economically.

Steam reforming catalyst of the present invention can be used in powder or granular form, but, in general it is used as tablet, ring, sphere, or extruded form. Forming of the catalyst of the present invention or the catalyst carrier can be effected without using a forming additive. However, such forming without using a forming additive is considerably difficult and troublesome, so that preferably a suitable forming additive is used. As the forming additive, any binders that ar generally used as forming additives for forming the catalysts or the catalyst carriers can be used, such as organic binders like methylcellulose, polyvinyl alcohol, etc., and inorganic binders like cements, etc. Use of calcium alumina cement is especially desirable, and exhibits also a subsidiary effect of remarkably improving the catalyst activity. Addition amount of the forming additive varies depending on the kind of the forming additive. For example, in case of calcium alumina cement, a desirable amount is about 10–40 wt % relative to the essential components of the catalyst carrier.

Catalyst of the present invention is used in steam reforming reactions of hydrocarbons. As the hydrocarbons in the reaction, methane, ethane, propane, butane, or mixtures thereof, or naphtha, etc., can be used. A reaction temperature in a range of 400°–1,200° C. is used, and a reaction pressure in a range of atmospheric to 40 kg/cm² is used. Mol ratio of steam to carbon in the raw material hydrocarbon used in the reaction is usually, in a range of 2–5. Space velocity SV can be selected within a range of 100–50,000, depending to the process conditions.

BRIEF DESCRIPTION OF THE DRAWINGS

For a better understanding of the present invention, reference is made to the accompanying drawings, in which.

DESCRIPTION OF THE PREFERRED EMBODIMENT

Hereinafter, the present invention will be explained in more detail with reference to examples, however, the present invention is of course not limited to these examples.

EXAMPLES 1–5 AND REFERENTIAL EXAMPLES 1–2

As starting raw materials, aluminum oxide and barium carbonate are fed to a ball mill, and pulverized and mixed for 24 hours. These mixed materials are then calcined at 1,450° C. for 5 hours to obtain catalyst carriers. Mol ratio of barium oxide to the sum of barium oxide and aluminum oxide were set respectively to 0% (Referential Example 1), 5% (Example 1), 10% (Example 2), 14.3% (Example 3), 15% (Example 4), 20% (Example 5) and 50% (Referential Example 2).

Figure 1:
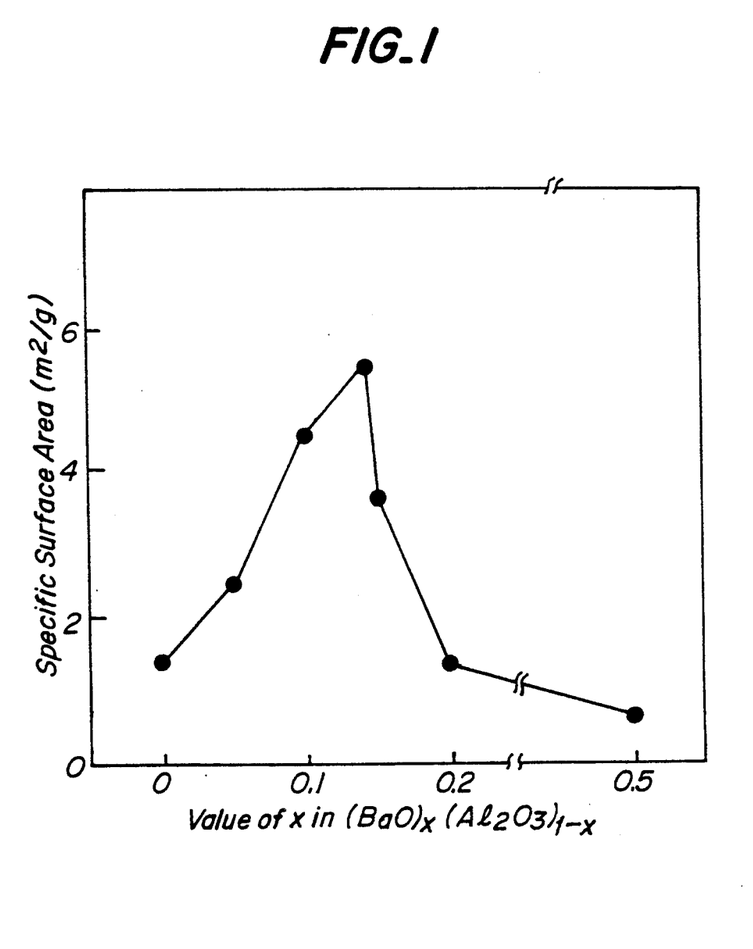
FIG. 1 is a graph showing a relation between the value x of a carrier $(BaO)_x(Al_2O_3)_{1-x}$ obtained by calcining at 1,450° C. for 5 hrs and the specific surface area thereof.

Compositions and BET specific surface areas of the carriers thus obtained are shown in the following Table 1 and attached FIG. 1.

X-ray diffraction patterns of the carriers containing 0, 10, 14.3, 15 and 50 mol % of barium oxide are measured to examine crystal structures of these carriers. The results are shown in attached FIG. 2. In the FIG. 2, the symbols ○ means $\alpha$-$Al_2O_3$, ● means $BaO \cdot 6Al_2O_3$, and the symbol ▲ means $BaO \cdot Al_2O_3$.

Figure 2:
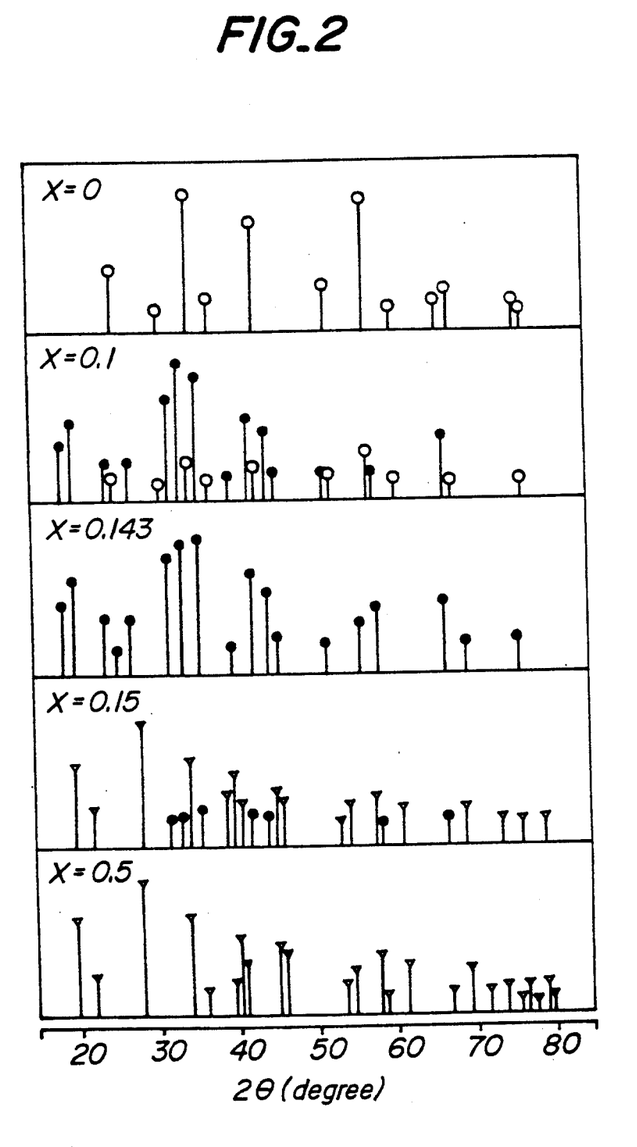
FIG. 2 is a graph of X-ray diffractions of $(BaO)_x \cdot (Al_2O_3)_{1-x}$.

The carrier containing 14.3 mol % of BaO exhibiting the maximum specific surface area shows the structure of $BaO \cdot 6Al_2O_3$ by X-ray diffraction, so that it is considered that the small reduction of the specific surface area of the carrier at high temperature is brought from the formation of the stable $BaO \cdot 6Al_2O_3$ phase.

TABLE 1

| Carrier | BaO (mol %) | $Al_2O_3$ (mol %) | Specific surface area (m²/g) |
| --- | --- | --- | --- |
| Referential Example 1 | 0 | 100 | 1.4 |
| Example 1 | 5 | 95 | 2.5 |
| Example 2 | 10 | 90 | 4.5 |
| Example 3 | 14.3 | 85.7 | 5.4 |
| Example 4 | 15 | 85 | 3.7 |
| Example 5 | 20 | 80 | 1.3 |
| Referential Example 2 | 50 | 50 | 0.7 |

EXAMPLES 6–11 AND REFERENTIAL EXAMPLES 3–7

Figure 3:
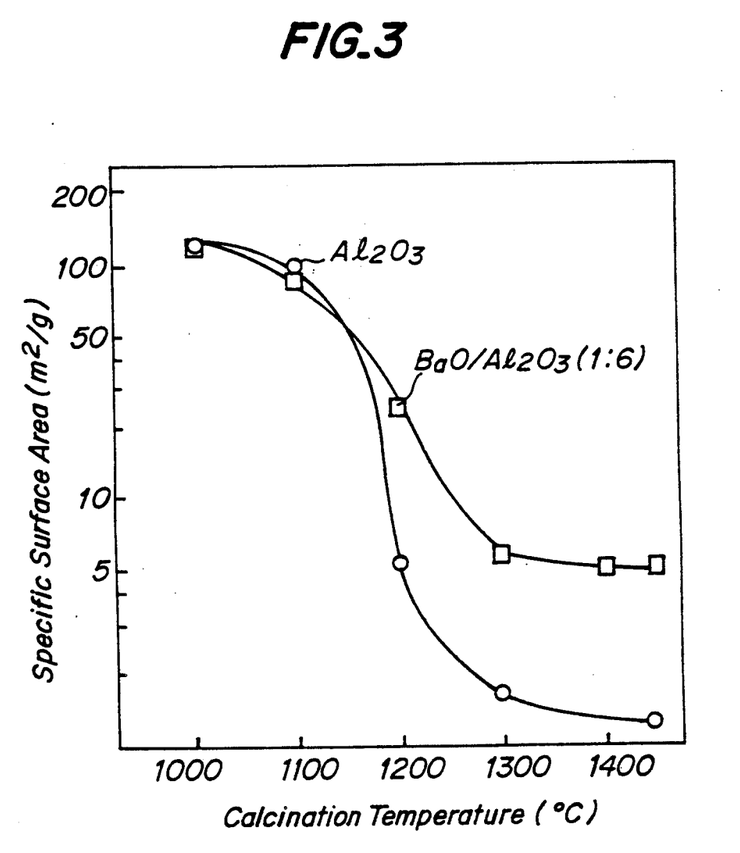
FIG. 3 is a graph showing a relation between the calcining temperature and the specific surface area of obtained Carriers $(BaO)_{0.143} \cdot (Al_2O_3)_{0.857}$ and $Al_2O_3$.

The same starting raw materials of $Al_2O_3$ and BaO as in Example 1 are pulverized and mixed as in Example 1 to produce uncalcined mixtures of $(Al_2O_3)_{0.857}(BaO)_{0.143}$. The uncalcined mixtures and referential γ-alumina not containing BaO are respectively calcined at 1,000° C., 1,100° C., 1,200° C., 1,300° C., 1,400° C. and 1,450° C. for 5 hours to obtain carriers of Examples 6–11 and Referential Examples 3–7. BET specific surface area of the carriers are shown in the following Table 2 and attached FIG. 3.

TABLE 2

|  | Calcining temperature (°C.) | Specific surface area (m²/g) |
|---|---|---|
| Example 6 | 1,000 | 125 |
| Example 7 | 1,100 | 89 |
| Example 8 | 1,200 | 24 |
| Example 9 | 1,300 | 6 |
| Example 10 | 1,400 | 5.3 |
| Example 11 | 1,450 | 5.4 |
| Referential Example 3 | 1,000 | 126 |
| Referential Example 4 | 1,100 | 102 |
| Referential Example 5 | 1,200 | 5.5 |
| Referential Example 6 | 1,300 | 1.7 |
| Referential Example 7 | 1,450 | 1.3 |

Figure 4:
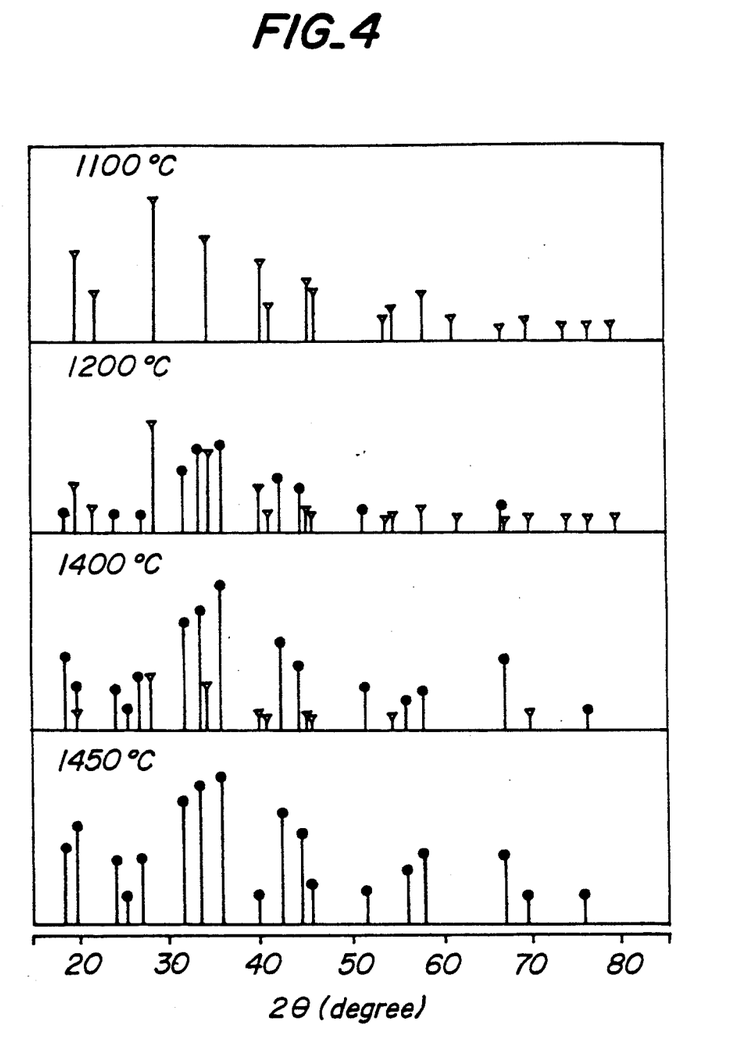
FIG. 4 is a graph of X-ray diffractions of the carrier $(BaO)_{0.143} \cdot (Al_2O_3)_{0.857}$ and $Al_2O_3$.

Crystal structures of the $(Al_2O_3)_{0.857}(BaO)_{0.143}$ carriers of Examples 7, 8, 10 and 11 respectively calcined at 1,100° C., 1,200° C., 1,400° C. and 1,450° C. are analyzed by X-ray diffraction. The results are shown in attached FIG. 4. In FIG. 4, the symbols ● and ▼ means $BaO·6Al_2O_3$ and $BaO·Al_2O_3$, respectively. As seen from FIG. 4, it is considered that the calcination of the uncalcined mixtures at a temperature of not less than 1,200° C. has produced high temperature heat resistant carriers comprising the formed $BaO·6Al_2O_3$, so that sintering of the carries has been suppressed or decreased to the minimum.

EXAMPLE 12

Aluminum nitrate and barium nitrate are dissolved in water in an $Al_2O_3$:BaO mol ratio of 85.7:14.3 to prepare an aqueous solution, and sodium carbonate is added to the solution to adjust pH thereof to 8 to form coprecipitates.

Thus obtained coprecipitates are washed, filtered, dried at 200° C. for 2 hours, precalcined at 500° C. for 2 hours, and thereafter calcined at 1,450° C. for 5 hours to obtain a carrier of Example 12.

BET specific surface area of the carrier was 5.5 m²/g.

EXAMPLES 13–15

Aluminum nitrate and nitrate of Me (Me is Ba, Ca or Sr) are dissolve in water in a mol ratio of $Al_2O_3$:MeO of 85.7:14.3 to prepare aqueous solutions thereof. The solutions are added with dropwise of aqueous ammonia to pH 8, and evaporated to dryness to form coprecipitation products. The formed products are dried at 200° C. for 2 hours, precalcined at 500° C. for 2 hours, and then calcined at 1,450° C. for 5 hours to obtain carriers of Examples 13, 14 and 15.

BET specific surface area of these carriers are shown in Table 3.

TABLE 3

|  | Composition | Specific surface area (m²/g) |
|---|---|---|
| Example 13 | $(BaO)_{14.3}(Al_2O_3)_{85.7}$ | 5.2 |
| Example 14 | $(CaO)_{14.3}(Al_2O_3)_{85.7}$ | 5.0 |
| Example 15 | $(SrO)_{14.3}(Al_2O_3)_{85.7}$ | 4.2 |

As seen from above Table 3, the addition of calcium oxide or strontium oxide to alumina also brought about retention of high specific surface area of the carriers at high temperatures.

EXAMPLES 16–17 AND REFERENTIAL EXAMPLE 8

Barium isopropoxide and aluminum isopropoxide are dissolved in isopropyl alcohol in a mole ratio of 1:12 to prepare an alcoholic solutions. The solutions are added with dropwise of water to effect hydrolysis thereof. The hydrolysis of the isopropoxides are carried out at a temperature of 80° C., in nitrogen atmosphere. Thus obtained suspension liquids are aged for 12 hours under agitation and then dried in reduced pressure to obtain uncalcined powders of Example 16.

Meanwhile, barium carbonate $BaCO_3$ and γ-alumina in a mol ratio of 1:6 are pulverized and mixed in a ball mill for 24 hours to obtain uncalcined powders of Example 17.

Thus obtained two types of powders and γY-alumina powder (Referential Example 8) are calcined at 1,000°, 1,100°, 1,200°, 1,300°, 1,450° and 1,600° C., respectively for 5 hours. BET specific surface area of these calcined powders are measured, and the results are shown in Table 4 below.

TABLE 4

|  | Specific surface area (m²/g) | | | | | |
|---|---|---|---|---|---|---|
|  | 1,000° C. | 1,100° C. | 1,200° C. | 1,300° C. | 1,450° C. | 1,600° C. |
| Example 16 | 79 | 60 | 38 | 18 | 12 | 11 |
| Example 17 | 125 | 90 | 23 | 6 | 5 | 4 |
| Referential Example 8 | 126 | 100 | 5 | 1.7 | 1.2 | 1.0 |

As seen from above Table 4, specific surface area of γ-alumina (Referential Example 8) decreased noticeably at around 1,200° C., and became about 1 m²/g at the temperatures above 1,400° C. The decrease of the specific surface area is caused by the phase transition of γ-alumina to α-alumina. In case of the powders of Example 17 obtained by the solids mixing method, specific surface area of the powders started to decrease much at 1,200° C., but the specific surface area of 5 m²/g was kept even at 1,400° C., and this is about 4 times higher than that of Referential Example 8. In case of the powders of Example 16 obtained by the alkoxide method, retention of the specific surface area is further improved, and is always about 2-3 times higher than that of Example 17. It kept high specific surface area of more than 10 m²/g even after it was calcined at 1,600° C. Thus, adoption of the alkoxide method undoubtedly brings about marked improvement of the specific surface area of the catalyst carrier or catalyst.

Figure 5:
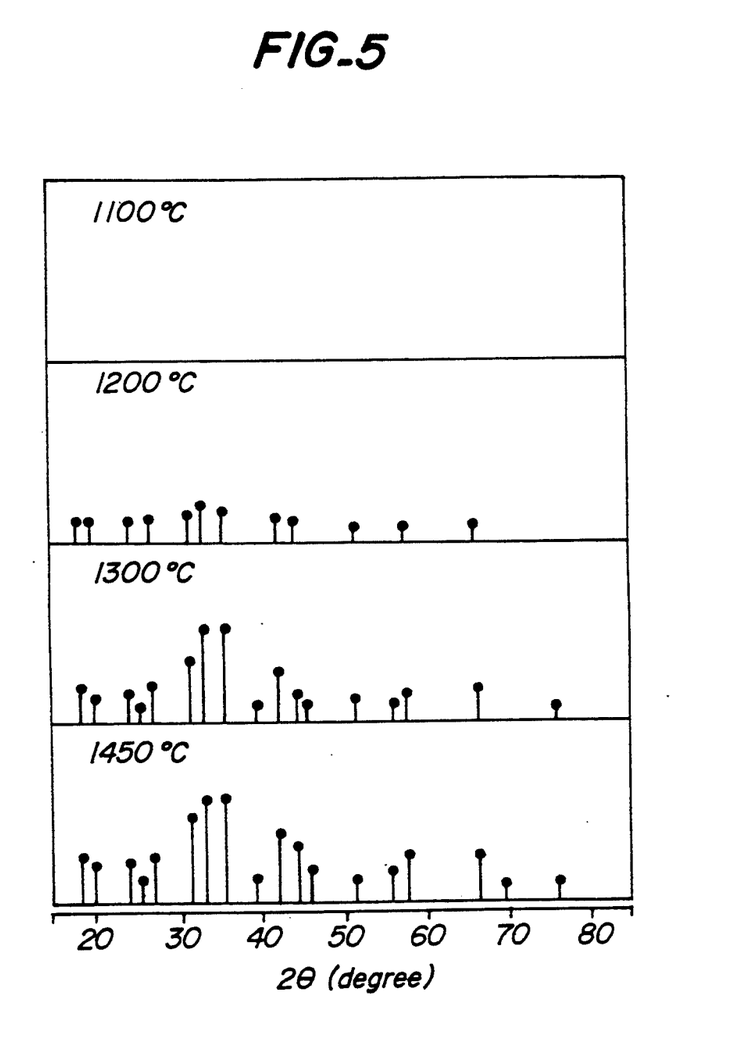
FIG. 5 is a graph of X-ray diffractions of a catalyst carrier $(BaO)_{0.14} \cdot (Al_2O_3)_{0.86}$ obtained by solids mixing method and alkoxide method and calcined at 1,000° C., 1,200° C., 1,450° C. or 1,600° C.

X-ray diffraction patterns of the calcined powders of Example 16 are measured, and the results are shown in FIG. 5. In FIG. 5, the symbol means $BaO.6Al_2O_3$.

The alkoxide method enables direct formation of aimed $BaO.6Al_2O_3$ at temperatures of 1,200° C. or higher without forming the intermediate $BaO.Al_2O_3$. The directly formed $BaO.6Al_2O_3$ appears to function to suppress the decrease of the specific surface area at 1,200° C. or temperatures higher than 1,200° C. In addition, the alkoxide method allows treatment of complexed oxides at low temperatures, and this is considered as a reason of affording the more stabilized high specific surface are of the products obtained from alkoxides.

EXAMPLES 18-20

By using aluminum isopropoxide and barium isopropoxide, calcium isopropoxide or strontium isopropoxide, various calcined powders of Examples 18, 19 and 20 of an $Al_2O_3$:MeO mol ratio of 85.7:14.3 are produced in the same manner as in Example 16.

BET specific surface area of these samples are measured. The results are shown in the following Table 5.

TABLE 5

|  | Composition | Specific surface area (m²/g) |
| --- | --- | --- |
| Example 18 | $BaO.6Al_2O_3$ | 13.8 |
| Example 19 | $CaO.6Al_2O_3$ | 12.5 |
| Example 20 | $SrO.6Al_2O_3$ | 12.3 |

EXAMPLE 21

Barium carbonate and aluminum hydroxide are fed to a ball mill, and pulverized and mixed for 24 hours to obtain a mixture of a Ba:Al mol ratio of 1:12. The mixture thus obtained is dried at 400° C. for 4 hours, then formed into cylinders of 3/16 inch diameter by using tablet machine. Thus obtained tablets are calcined at 1,300° C. for 5 hours to obtain catalyst carriers. As a result of X-ray diffraction measurement, the catalyst carriers are essentially composed of $BaO.6Al_2O_3$. The catalyst carriers are impregnated with an aqueous solution of nickel nitrate, and calcined at 600° C. for 5 hours to obtain steam reforming catalysts for hydrocarbons. Nickel content of the catalysts is 5 wt % calculated as nickel oxide NiO.

The catalysts thus produced are calcined at a temperature of 900° C., 1,100° C., 1,300° C. or 1,400° C., respectively for 5 hours in air to examine formation of nickel aluminate. Formation of nickel aluminate is judged by appearance of nickel aluminate peak ($2\theta=45.1°$) and disappearance of NiO peak ($2\theta=43.51°$) in X-ray diffraction measurement by Cu-K$\alpha$ ray. As a result of X-ray diffraction measurement, it is found out that nickel aluminate is not produced up to the temperature of 1,300° C.

REFERENTIAL EXAMPLE 9

Commercial aluminum hydroxide is dried at 400° C. for 4 hours, formed into cylinders of 3/16 inch diameter by using a tablet machine, and then calcined at 1,300° C. for 5 hours in an electric furnace to obtain a catalyst carrier. As a result of X-ray diffraction measurement, main component of the catalyst carrier is found to be $\alpha$-$Al_2O_3$. The catalyst carrier is impregnated with an aqueous solution of nickel nitrate, and calcined at 600° C. for 5 hours to obtain a steam reforming catalyst for hydrocarbons. Nickel content of this catalyst is 5 wt % calculated as nickel oxide NiO.

The catalyst is used in a nickel aluminate formation test in the similar manner a in Example 21. As the result of the test, it is found that nickel aluminate is formed even at 900° C. by using the Ni/$Al_2O_3$ catalyst.

EXAMPLE 22

A catalyst consisting of 5 wt % of nickel oxide NiO supported on a carrier essentially composed of CaO.-$6Al_2O_3$ is prepared, in the similar manner as in Example 21 except that aluminum hydroxide and calcium carbonate are used as raw materials. The catalyst is used in a nickel aluminate formation test in the same manner as in Example 21 to find that nickel aluminate is not formed up to the temperature of 1,100° C.

EXAMPLE 23

A catalyst consisting of 5 wt % of NiO supported on a carrier essentially composed of $SrO.6Al_2O_3$ is prepared, in the similar manner as in Example 21 except that aluminum hydroxide and strontium carbonate are used as raw materials. The catalyst is used in a nickel aluminate formation test in the same manner as in Example 21 to find that nickel aluminate is not formed up to the temperature of 1,200° C.

EXAMPLES 24-26

Using the same catalyst as used in Examples 21-23, steam reforming tests of butane are performed. Prior to the tests, 200 cc of cylinder type catalysts of 316 inch diameter and 3/13 inch height are charged into a reactor of 30 mm diameter, then reduced by passing hydrogen at rate of 200 Nl/hr for 5 hours under atmospheric pressure at 500° C.

The steam reforming reactions are performed by passing butane of 100 g/hr, water of 385 g/hr and hydrogen of 4.4 Nl/hr to the reactor containing the reduced catalyst. At about 2 hours after the settling of the reaction conditions (reaction temperature of 850° C. and reaction pressure of 16 kg/cm²G), the outlet gas is analyzed by TCD gaschromatograph. The result of this analysis is shown in Table 7.

REFERENTIAL EXAMPLE 10

Using the same NiO (5 wt %)/$\alpha$-$Al_2O_3$ catalyst as that produced in Referential Example 8, a steam reforming test is performed in the same manner as in Examples 24-26. Test result is shown in the following Table 7.

TABLE 7

|  | Example 24 | Example 25 | Example 26 | Referential Example 10 |
|---|---|---|---|---|
| Composition of carrier | $BaO.6Al_2O_3$ | $CaO.6Al_2O_3$ | $SrO.6Al_2O_3$ | $\alpha\text{-}Al_2O_3$ |
| Composition of outlet gas |  |  |  |  |
| $CH_4$ | 4.9 | 5.1 | 5.0 | 6.6 |
| CO | 15.1 | 15.0 | 15.0 | 14.3 |
| $CO_2$ | 11.5 | 11.6 | 11.6 | 12.0 |
| $H_2$ | 68.5 | 68.3 | 68.4 | 67.1 |

EXAMPLE 27

A catalyst is prepared in the similar manner as in Example 21 except that a mixture of raw materials for the carrier is shaped into rings of ⅜ inch outer diameter, ¼ inch inner diameter and ⅜ inch height and then pulverized to 3.5–4 mesh size. Using the catalyst, a steam reforming test of methane is performed, in which 25 cc of the catalyst is charged in a reactor of 1 inch diameter, with reaction conditions of a reaction pressure of 10 kg/cm²G, a reaction temperature of 650°–870° C., GHSV of 15,000 hr⁻¹, and inlet $H_2O/CH_4$ mol ratio of 3.0. After measuring the initial activity, the reaction temperature is set to 870° C. and only steam is passed for further 16 hrs, and then again the steam reforming reaction at the temperature of 650°–870° C. is performed to measure an extent of decrease of the catalyst activity. Catalyst activity is measured by the content of unreacted $CH_4$ in the dry exit gas at the outlet of the reactor. In commercial reforming apparatuses, it frequently happens that only steam is flowed into a steam reformer to keep its temperature, in case when an apparatus other than the steam reformer has some other trouble. In such case of operation called as steaming, if the reactivity of the catalyst carrier is high, nickel metal supported on the carrier reacts with aluminum in the carrier to form nickel aluminate which decreases activity of the catalyst. As a method of reproducing such phenomenon in an experiment, only steam is flowed into reactor at 870° C. (steaming), and stability of the carrier is measured by a succeeding methane-steam reforming test. The result is shown in the following Table 8.

REFERENTIAL EXAMPLE 11

A catalyst carrier is produced in the same manner as in Referential Example 8, except that the raw materials of the carrier are first shaped into rings of ⅜ inch outer diameter, ¼ inch inner diameter and 5/8 inch height and then pulverized to 3.5–4 mesh. The catalyst is used in a steam reforming test of methane in a same method as in Example 27. The result of the test is shown in the following Table 8.

TABLE 8

| Reaction temperature | $CH_4$ content (%) at outlet of reactor | |
|---|---|---|
|  | Example 27 | Referential Example 10 |
| (Initial reaction) |  |  |
| 650° C. | 9.23 | 12.08 |
| 760° C. | 1.65 | 3.05 |
| 870° C. | 0.23 | 0.56 |
| (870° C., after steaming for 16 hrs) |  |  |
| 650° C. | 9.99 | 13.32 |
| 760° C. | 2.66 | 4.54 |
| 870° C. | 0.45 | 1.13 |
| (Additional 870° C., after steaming for 16 hrs) |  |  |
| 650° C. | 10.88 | 14.34 |
| 760° C. | 3.08 | 5.36 |
| 870° C. | 0.65 | 1.58 |
| (Additional 870° C., after steaming for 16 hrs) |  |  |
| 650° C. | 12.19 | 16.50 |
| 760° C. | 3.52 | 6.34 |
| 870° C. | 0.76 | 1.75 |

As seen clearly from the Examples shown above, the catalyst of the present invention has splendid advantages that the activity for steam reforming reaction is high and that nickel aluminate or cobalt aluminate is hardly produced even when it is exposed to an oxidizing atmosphere due to air and steam at high temperature. The difficulty of formation of nickel aluminate or cobalt aluminate means that the activity of the catalyst is slightly decreased, even if the atmosphere in the reformer becomes to an oxidizing atmosphere by some reasons. This is great advantage in operating an apparatus of steam reforming.

EXAMPLE 28

A catalyst carrier consisting essentially of $BaO.6Al_2O_3$ is produced in the same manner as in Example 21, then impregnated with an aqueous solution of cobalt nitrate, and calcined at 600° C. for 5 hours to obtain a catalyst for reforming hydrocarbons. Supported amount of cobalt is 5 wt % calculated as cobalt oxide.

Thus produced catalyst is calcined in air at 900° C., 1,100° C., 1,300° C. or 1,400° C. for 5 hrs to examine formation of cobalt aluminate. Formation of cobalt aluminate is judged by disappearance of NiO peak of $2\theta=43.51°$ in X-ray diffraction measurement using Cu-K$\alpha$ ray. The results are shown in the following Table 9.

EXAMPLES 29 AND 30 AND REFERENTIAL EXAMPLE 12

A $CaO.6Al_2O_3$ carrier same as that of Example 22, an $SrO.6Al_2O_3$ carrier same as that of Example 23 and an $Al_2O_3$ carrier same as that of Referential Example 8, are impregnated with an aqueous solution of cobalt nitrate, and calcined at 600° C. for 5 hrs to obtain hydrocarbon reforming catalyst. Supported amount of Co of these catalysts are 5 wt % each.

The catalysts are examined in the same manner as in Example 28 to examine formation of cobalt aluminate. The test results are shown in the following Table 9.

TABLE 9

| Carrier | | Formation of cobalt aluminate | | | |
|---|---|---|---|---|---|
| | | 900° C. | 1,100° C. | 1,300° C. | 1,400° C. |
| Example 28 | BaO.6Al$_2$O$_3$ | O | O | O | X |
| Example 29 | CaO.6Al$_2$O$_3$ | O | O | X | X |
| Example 30 | SrO.6Al$_2$O$_3$ | O | O | X | X |
| Referential Example 12 | Al$_2$O$_3$ | X | X | X | X |

O  No formation of cobalt aluminate
X  Formation of cobalt aluminate

EXAMPLES 31-33

As starting raw materials, barium carbonate, calcium hydroxide and aluminum hydroxide are fed to a ball mill, and pulverized and mixed for 12 hours to produce a mixture. The mixture is then formed into rings of ⅜" outer diameter, ⅜" inner diameter and ¼" height. After forming, the rings are calcined in an electric furnace at 1,300° C. for 3 hrs to obtain three carriers of Ba-Ca-Al series. Crush strengths of these carriers, and BaO:-CaO:Al$_2$O$_3$ mol ratios are shown in Table 10.

TABLE 10

| | BaO:CaO:Al$_2$O$_3$ mol ratio | Crush strength (kg) |
|---|---|---|
| Example 31 | 11.9:2.6:85.5 | 18 |
| Example 32 | 10.4:4.6:85.0 | 24 |
| Example 33 | 9.3:6.1:84.6 | 18 |

EXAMPLE 34

Setting BaO:CaO:Al$_2$O$_3$ mol ratio to 10.4:4.6:85.0, barium acetate, alumina cement and aluminum hydroxide are fed to a ball mill, and mixed in wet state for 30 min. Here the alumina cement used is composed of 80.5% of Al$_2$O$_3$ and 19.5% of CaO. The mixture is dried at 400° C. for 4 hrs, formed into rings of ⅜" outer diameter ×⅜" inner diameter ×¼" height, and then cured for 24 hrs. The rings are dried at 400° C., and then calcined at 1,300° C. for 5 hrs to obtain a catalyst carrier. Crush strength of the catalyst is 28 kg, and the composition of the catalyst carrier is mixed crystals of BaO.Al$_2$O$_3$, BaO.6Al$_2$O$_3$ and α-Al$_2$O$_3$ by an X-ray diffraction analysis. The catalyst carrier is impregnated with an aqueous solution of nickel nitrate, and calcined at 600° C. for 5 hrs to obtain an NiO/Ba-Ca-Al series catalyst. Supported amount of Ni is 5 wt % calculated as nickel oxide.

REFERENTIAL EXAMPLES 13-20

Using barium acetate, barium nitrate, barium carbonate or barium hydroxide as barium sources, and boehmite or aluminum hydroxide as aluminum source, raw materials of a BaO:Al$_2$O$_3$ mol ratio of 1:6 are fed to a ball mill, and kneaded in wet state. The mixture is dried at 400° C., then formed into rings of ⅜" outer diameter ×⅜" inner diameter and ¼" height. The rings are calcined at 1,300° C. for 5 hrs, and crush strength thereof are shown in the following Table 11.

TABLE 11

| | Ba source | Al$_2$O$_3$ source | Crush strength (kg) |
|---|---|---|---|
| Referential Example 13 | barium acetate | AlOOH | 11.7 |
| Referential Example 14 | barium acetate | Al(OH)$_3$ | 1.2 |
| Referential Example 15 | barium nitrate | AlOOH | 9.3 |
| Referential Example 16 | barium nitrate | Al(OH)$_3$ | <1.0 |
| Referential Example 17 | barium carbonate | AlOOH | 1.8 |
| Referential Example 18 | barium carbonate | Al(OH)$_3$ | 1.8 |
| Referential Example 19 | barium hydroxide | AlOOH | 10.1 |
| Referential Example 20 | barium hydroxide | Al(OH)$_3$ | 6.3 |

REFERENTIAL EXAMPLE 21

The process of Example 1 is repeated using aluminum hydroxide as a starting raw material to obtain an α-Al$_2$O$_3$ carrier. The carrier is impregnated with an aqueous solution of nickel nitrate, and calcined at 600° C. for 5 hrs to obtain an NiO/α-Al$_2$O$_3$ catalyst. Crust strength of the catalyst is 10.1 kg.

EXAMPLE 35

Spalling tests are performed on the catalysts prepared in Examples 32 and 34 and Referential Examples 13 and 21. In the spalling test, catalyst is rapidly heated to 1,000° C. in aerial atmosphere and held thereat for 15 min, quenched in a flowing water for 3 min, left in a room temperature for 2 min then rapidly heated again to 1,000° C., and the operations are repeated for 10 times. Thereafter, crush strengths of the catalysts are measured. This is a test for examining thermal shock resistant property of the catalysts by measuring differences of crush strengths of the catalysts before and after the test, wherein a smaller difference of crush strengths means a better spalling property of the catalyst. The results of the spalling test are shown in Table 12.

TABLE 12

| Catalyst | Crush strength before test (kg) | Crush strength after test (kg) |
|---|---|---|
| Example 32 | 24.0 | 9.0 |
| Example 34 | 28.0 | 19.4 |
| Referential Example 13 | 11.7 | 8.7 |
| Referential Example 21 | 10.1 | 5.2 |

As apparent from the foregoing explanations, the steam reforming catalyst of the present invention exhibits high activity, splendid mechanical strength, heat resistant property, chemical stability, and thermal shock resistant property, retains a high specific surface area at high temperatures, and does not form nickel aluminate or cobalt aluminate in steam reforming reactions of hydrocarbons, so that the reforming catalyst of the present invention can retain its activity for a long period of use and is very useful and economical. Therefore, the present invention is eminently useful in industry.

What is claimed is:

1. A steam reforming catalyst for hydrocarbons having at least one of nickel oxide, cobalt oxide and a platinum group noble metal supported on a carrier, the carrier consisting essentially of aluminum oxide $Al_2O_3$, a metal oxide expressed by MeO and a forming additive, the metal oxide MeO and aluminum oxide $Al_2O_3$ being present in a mol ratio of about (11.1-17.6):100 in the form of a complexed oxide expressed mainly as MeO.-$6Al_2O_3$, Me being at least one metal selected from the group consisting of calicium Ca, barium Ba and strontium Sr.

2. A steam reforming catalyst as defined in claim 1, comprising about 3-50 parts by weight of at least one of nickel oxide and cobalt oxide supported on the carrier relative to 100 parts by weight of the carrier.

3. A steam reforming catalyst as defined in claim 1, comprising about 0.03-3 parts by weight of at least one platinum group noble metal supported on the carrier relative to 100 parts by weight of the carrier.

4. A steam reforming catalyst as defined in claim 1, comprising about 3-50 parts by weight of at least one of nickel oxide and cobalt oxide, and about 0.03-3 parts by weight of at least one platinum group noble metal, supported on the carrier relative to 100 parts by weight of the carrier.

5. A stream reforming catalyst as defined in claim 1, wherein the forming additive is a calcium alumina cement, present in an amount of about 10-40 wt % relative to the metal oxide and aluminum oxide components of the carrier.

6. A method of producing a steam reforming catalyst for hydrocarbons, comprising mixing aluminum oxide $Al_2O_3$ and/or aluminum hydroxide and an Me compound, wherein Me is at least one metal element selected from Ca, Ba and Sr in an $Al_2O_3$:Meo mol ration of 100:(11.1-17.6) to make a mixture, forming the mixture with the addition of a forming additive, calcining the mixture to provide a catalyst carrier at a temperature of not less than 900° C., impregnating the catalyst carrier with an aqueous solution of at least one of a nickel compound, a cobalt compound and a platinum group noble metal compound, and calcining the impregnated catalyst carrier.

7. A method of producing a steam reforming catalyst as defined in claim 6, wherein the forming additive is a calcium alumina cement and is added in a ratio of about 10-40 wt % relative to the aluminum oxide and/an aluminum hydroxide and Me components.

8. A method of producing a steam reforming catalyst as defined in claim 7, wherein the mixture of aluminum oxide $Al_2O_3$ and/or aluminum hydroxide and Me compound is a coprecipitate or a hydrolysis product or a heat decomposition product obtained from mixed solution of a water soluble or alcohol soluble aluminum compound and a water soluble or alcohol soluble compound of Me.

9. A method of producing a steam reforming catalyst as defined in claim 8, wherein a portion or the whole of the mixture of aluminum oxide $Al_2O_3$ and/or aluminum hydroxide and Me compound is a hydrolysis product or a heat decomposition product of a mixed or complexed alkoxides of aluminum and the metal Me.

10. A method of producing a steam reforming catalyst as defined in claim 8, wherein a portion or the whole of the aluminum oxide $Al_2O_3$ and/or aluminum hydroxide contained in the mixture before calcination is a hydrolysis product or a heat decomposition product of at least one aluminum alkoxide.

11. A method of producing a steam reforming catalyst as defined in claim 1, wherein the catalyst carrier is produced by mixing and/or kneading powdery aluminum oxide $Al_2O_3$ and/or powdery aluminum hydroxide and a powdery Me compound or a solution of Me compound, and calcining.

* * * * *